United States Patent Office 3,520,778
Patented July 14, 1970

3,520,778
MICROBIOLOGICAL DEMETHYLATION PROCESS
Paul Bellet, Paris, and Truong Van Thuong, Clichy-sous-Bois, France, assignors to Roussel-UCLAF, Paris, France, a corporation of France
No Drawing. Filed Nov. 18, 1966, Ser. No. 595,335
Claims priority, application France, Nov. 25, 1965, 39,771; Jan. 19, 1966, 46,454
Int. Cl. C12d *13/00*
U.S. Cl. 195—51          5 Claims

ABSTRACT OF THE DISCLOSURE

The invention relates to a novel process for the preparation of heterocyclic compounds having at least one >NH hydroindole ring and to novel products produced thereby. The invention also relates to novel antifibrillary compositions and to a novel method of preventing fibrillations in warm-blooded animals.

PRIOR ART

Alkaloids and their derivatives possess very interesting physiological properties and therefore they are used for the preparation of numerous medicines. A certain number of these alkaloids possess a free dihydroindole >NH grouping while other alkaloids of the same family do not possess the free dihydroindole >NH form, but one blocked with a substituent such as an >N-methyl group, i.e., ajmaline, tetraphyllicine, folicanthine, esersine, vinblastine, etc.; or >N-acyl, i.e., aspidospermine (Acyl=—COCH$_3$)

vincristine (Acyl=—COH), etc.

The N-methyl and N-acyl derivatives are relatively easy to prepare from the free hydroindole >NH compound, but the preparation of the hydroindole >NH compound from the corresponding >N—CH$_3$ which is an intermediate for the preparation of >N-acyl derivatives is very difficult and there is no known process for accomplishing this demethylation in a simple and general fashion.

OBJECTS OF THE INVENTION

It is an object of the invention to provide a novel process of preparing free hydroindole >N—H compounds.

It is another object of the invention to provide a novel process for demethylation of indole alkaloids having a hydroindole >N—CH$_3$ grouping.

It is a further object of the invention to provide novel demethylated alkaloids.

It is an additional object of the invention to provide novel antifibrillary compositions.

It is another object of the invention to provide a novel method of preventing fibrillations in warm-blooded animals.

These and other objects and advantages of the invention will become obvious from the following detailed description.

THE INVENTION

The novel method of the invention of demethylating compounds having a hydroindole >N—CH$_3$ group comprises subjecting an alkaloid compound having a N-methyl hydroindole grouping to the action of organisms of the genus Streptomyces in a culture medium to form the corresponding N-demethylated derivative and recovering the latter.

This method of microbiological conversion, which is entirely novel, can be used for numerous applications in the industry and by the process of the invention, it is now possible to convert in one single step a hydroindole N-methylated alkaloid, which are readily available from natural sources, into the corresponding N-demethylated analogue and its non-toxic, pharmaceutically acceptable acid addition salts which have, from the physiological point of view, the great advantages of superior activity and lower toxicity as compared with the starting alkaloids. For example, the dihydrochloride of N-demethylajmaline, obtained by microbiological demethylation of ajmaline, has less toxicity than ajmaline hydrochloride while showing an antifibrillary activity superior to that of the latter. Moreover, the N-demethylated compounds are useful for the preparation of other N-substituted derivatives such as N-acylated, N-alkylated and N-hydroxymethylated derivatives of alkaloids which also possess therapeutic utility.

The process of the invention not only provides a novel path of obtaining novel compounds which are difficult or even impossible to obtain by the usual chemical methods, it also offers a process for the preparation of alkaloids N-acylated on the hydroindole nitrogen atom, which are outstanding for their physiological activity, but which, unfortunately, are very poorly distributed in the vegetable kingdom, by starting with more abundant raw materials, the corresponding N-methylated alkaloids.

Vincristine, an alkaloid possessing a dihydroindolic N-formyl grouping, is utilized in the treatment of leukemia and this compound, which is not found in any abundant natural source, can now be prepared by starting with another alkaloid of the same group widely distributed in nature, namely vinblastine having a dihydroindole N-methyl grouping by microbiological demethylation according to the process of the invention and subsequent formylation of the N-demethylated derivative thus obtained.

Examples of suitable organisms of the genus Streptomyces are *Streptomyces griseus, Streptomyces lavandulae, Streptomyces rimosus, Streptomyces chattanoogensis, Streptomyces platensis, Streptomyces roseochromogenes*, etc. Particularly preferred for N-demethylation of ajmaline is *Streptomyces platensis* (NRRL 2364) under aerobic conditions at incubation temperatures of 25 to 37° C. for 3 to 6 days.

The process is unexpected since when using as the microorganism, Fungus of the genus Rhyzopus, Gongronella or Cuninghamella, no N-demethylation of ajmaline is effected. The remarkable result is even more unexpected since Streptomyces are known to hydroxylate indole alkaloids having a hydroindole group with a free >NH. Apparently, the presence of the methyl group on the hydroindole nitrogen is sufficient to prevent microbiological hydroxylation of the substrata previously to the N-demethylation.

Examples of suitable non-toxic, pharmaceutically acceptable acid addition salts of N-demethyl-ajmaline are inorganic acids such as hydrochloric acid, nitric acid, sulfuric acid, etc. and organic acids such as acetic acid, citric acid, tartaric acid, etc.

The antifibrillary compositions are composed of at least one compound selected from the group consisting of N-demethyl-ajmaline and its non-toxic, pharmaceutically acceptable acid addition salts and a major amount of a pharmaceutical carrier.

N-demethyl-ajmaline is endowed with interesting pharmacological properties and particularly possesses a remarkable regulating action for cardiac rhythm. It can be utilized for the treatment of complete arrhythmia by auricular fibrillation, of extra-systolic arrhythmia, of paroxystic tachycardia, of auricular flutter, of tachycardia of nervous or exophthalmic origin, of palpitations and of cardiac erethism.

The novel method of preventing fibrillations in warm-blooded animals comprises administering to warm-blooded animals an effective amount of at least one compound selected from the group consisting of N-demethyl-ajmaline and its non-toxic, pharmaceutically acceptable acid addition salts. The said products may be administered orally, transcutaneously or rectally. The usual useful daily dose is 0.3 to 3 mg./kg. depending upon the method of administration.

In the following example there are described several preferred embodiments to illustrate the invention. However, it should be understood that the invention is not intended to be limited to the specific embodiment.

EXAMPLE

Preparation of N-demethyl-ajmaline

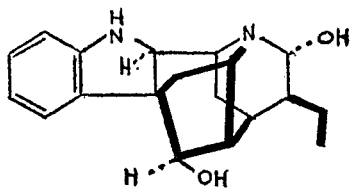

A culture media called "117-glucose" was prepared from 10 gm. of separately sterilized glucose, 10 gm. of corn-steep liquid, 10 gm. of soybean flour, 5 gm. of dry malt extract, 1 gm. of calcium carbonate and 5 gm. of sodium chloride in sufficient distilled water to obtain a final volume of 1000 cc. of solution: 100 cc. of the said culture media was introduced in a 250 cc. flask and heated at 120° C. for 30 minutes to sterilize the solution. The medium was then innoculated with 1 cc. of an aqueous suspension containing $5 \times 10^7$ spores of Streptomyces Platensis NRRL 2364 and the mixture was then cultivated with aeration in a rotary shaker for 48 hours at 28° C. to obtain a preliminary culture.

To 100 cc. of a sterile media called "304 DL" prepared from 3 gm. of sodium nitrate, 1.3 gm. of dipotassium phosphate, 0.5 gm. of $MgSO_4 \cdot 7H_2O$, 0.01 gm. of $FeSO_4 \cdot 7H_2O$, 0.5 gm. of potassium chloride, 30 gm. of separately sterilized dextrine and 5 gm. of separately sterilized extract of Difco yeast in sufficient water to obtain 1000 cc. was added with 10 cc. of the preliminary culture and the mixture was incubated at 28° C. for 28 hours. Then, a solution of 20 mg. of ajmaline in 1 cc. of ethanol was added to the culture media and the mixture was agitated in the rotary shaker for 120 hours at a temperature of 28° C. One hundred samples were run simultaneously.

Each of the 100 samples were poured into identical flasks, and the mycelium was filtered off and then washed with water and then with acetone which was added to the filtrate. Next, the filtrate was extracted with a chloroform-methanol mixture (4:1) The organic phases were combined, dried and evaporated to dryness under vacuum to obtain a residual oil which was purified by chromatography through a column of florisil with elution with chloroform containing 1 to 5% methanol. N-demethyl-ajmaline was isolated in crystalline form after evaporation of the solvents and had a melting point of about 290° C. (capillary tube and a specific rotation $[\alpha]_D^{20} = +82$ (c.=0.5% in methanol)

The solvated product (chloroform-methanol) occurred in the form of colorless prisms which were insoluble in water and soluble in hot ethanol.

Ultra-violet spectra—
Ethanol:

$\lambda$ max. to 240 m$\mu$ $E_{1\,cm.}^{1\%} = 204$ $\lambda$ max. to 289 m$\mu$ $E_{1\,cm.}^{1\%} = 76$ Ethanol N/10 hydrochloric acid:

$\lambda$ max. to 240 m$\mu$ $E_{1\,cm.}^{1\%} = 169$ $\lambda$ max. to 289 m$\mu$ $E_{1\,cm.}^{1\%} = 65$ Ethanol N/10 sodium hydroxide:

$\lambda$ max. to 240 m$\mu$ $E_{1\,cm.}^{1\%} = 190$ $\lambda$ max. to 289 m$\mu$ $E_{1\,cm.}^{1\%} = 76$ This compound is not described in the literature.

Ajmaline, subjected under analogous conditions to the action of cultures of *S. Griseus, S. Lavandulae* and *S. Roseo-chromogenes,* was converted into N-demethyl-ajmaline.

Neutral tartrate of N-demethyl-ajmaline

This water-soluble salt was prepared under the usual conditions by neutralization of a methanolic solution of N-demethyl-ajmaline with tartaric acid, followed by concentration of the mixture and addition of ether to the residue to obtain the crystalline tartrate salt of N-demethyl-ajmaline in the form of colorless prisms solvated with methanol. The product had a melting point of about 280° C. (capillary tube) and a specific rotation $[\alpha]_D^{20} = +64°$ (c.=1% in water).

Ultra-violet spectra—

$\lambda$ max. to 240–241 m$\mu$ $E_{1\,cm.}^{1\%} = 151$ $\lambda$ max. to 288–289 m$\mu$ $E_{1\,cm.}^{1\%} = 58$ Ethanol N/10 hydrochloric acid:
Ethanol N/10 sodium hydroxide:

$\lambda$ max. to 241 m$\mu$ $E_{1\,cm.}^{1\%} = 167$ $\lambda$ max. to 289 m$\mu$ $E_{1\,cm.}^{1\%} = 69$ This compound is not described in the literature.

Dihydrochloride of N-demethyl-ajmaline 345 mg. of N-demethyl-ajmaline were dissolved in 12 cc. of a methanol-chloroform mixture (2:1), made distinctly acidic with normal hydrochloric acid, followed with ether until slight turbidity occurred. The crystallization was completed and the crystals were vacuum filtered and dried to obtain 342 mg. of dihydrochloride of N-demethyl-ajmaline in the form of colorless crystals having a melting point of 260° C. (capillary tube).

*Analysis.*—$C_{19}H_{24}O_2N_2 \cdot 2$ HCl; molecular weight= 385.33. Calculated (percent): C, 59.3; H, 6.8. Found (percent): C, 59.4; H, 6.8.

This compound is not described in the literature.

Pharmacological study of N-demethyl-ajmaline (A) *Antifibrillary activity on the rabbit.*—Aconitine injected intravenously in weak doses (10–20 $\gamma$/kg.) causes respiratory excitation and significant changes in the cardiac rhythm in the rabbit. By repeating these injections, an arrhythmia is brought on which leads to fibrillation; the final intoxication is then evidenced in the blood pressure by a violent hypertension followed by a progressive hypotension resulting in the death of the animal. The tests were performed on rabbits anesthetized with urethane; the blood pressure, the electrocardiogram and the respiratory activity of the rabbit were recorded. It was ascertained that one or two doses of 1 mg./kg. of ajmaline and of N-demethyl-ajmaline, used in the form of non-toxic, pharmacologically acceptable acid addition salts, suppressed the arrhythmia, the extra systoles and also the fibrillation, and that they protected the animal against a subsequent dose of 10 $\gamma$/kg. of aconitine with N-demethyl-ajmaline being still less hypotensive than the ajmaline.

(B) Action against cardiac toxicity of aconitine in the guinea pig.—In guinea pigs weighing between 400 to 600 gm., anesthetized with urethane and placed under artificial respiration, continued intravenous perfusion of aconitine caused irreversible cardiac changes leading to fibrillation and finally to the death of the animal. The aconitine solution, at a concentration of 100 γ/cc. in physiological serum, was perfused through the jugular vein at a rate of 0.90 cc. per hour until the death of the animal ascertained with an electrocardiagram.

The average fatal dose of aconitine per 1 kg. of animal weight under these experimental conditions was found to be 134 γ/kg. The perfusion of this same solution, admixed with 1–2 or 5 mg./cc. of the antifibrillant and under the same experimental conditions allowed an estimation of the protective activity of the product by determination of the fatal dose.

The results are summarized in Table I and they show that N-demethylajmaline at a concentration of 5 mg./cc. produced a significant protective effect.

TABLE I

| Products | Ratio of doses | Antifibrillant perfused dose in mg./kg. | Fatal dose in aconitine in γ/kg. ± standard deviation |
| --- | --- | --- | --- |
| Aconitine | | 0 | 134±27 |
| Aconitine + ajmaline HCl | 1/10 | 1.20 | 120±56 |
| Aconitine + ajmaline HCl | 1/20 | 3.74 | 187±118 |
| | 1/50 | 7.45 | 149±21 |
| Aconitine+N-demethyl ajmaline HCl | 1/50 | 18.65 | 337±228 0.05>p>0.02 |
| Aconitine+quinidine sulfate | 1/50 | 11.70 | 234±13 | standard deviation $\sqrt{\frac{\Sigma d^2}{n-1}}$ (C) Toxicity determination.—The acute toxicity test was carried out on mice of the Rockland strain weighing about 20 gm. each. The test products were administered intravenously as a solution in physiological serum in increasing doses and compared with ajmaline. The animals were kept under observation for 1 week.

The 50% lethal dose ($DL_{50}$) of dihydrochloride of N-demethyl-ajmaline was 64 mg./kg.±2.92, and 25.5 mg./kg.±0.86 for the ajmaline hydrochloride. Ajmaline is more than twice as toxic as N-demethyl-ajmaline.

Various modifications of the compositions and process of the invention may be made without departing from the spirit or scope thereof.

We claim:
1. A method of demethylating an alkaloid compound having an N-methyl hydroindole grouping which comprises subjecting an alkaloid compound selected from the group consisting of ajmaline and vinblastine to the action of organisms of the genus Streptomyces in a culture medium to form the corresponding N-demethylated derivative and recovering the latter.
2. The process of claim 1 wherein the N-demethylated derivative is reacted with a non-toxic, pharmaceutically acceptable acid to form the corresponding acid addition salt of the N-demethylated derivative.
3. The process of claim 1 wherein the alkaloid compound is ajmaline and N-demethyl-ajmaline is produced.
4. The process of claim 3 wherein the Streptomyces is *Streptomyces platensis*.
5. The process of claim 3 wherein the incubation temperature is about 25 to 37° C.

References Cited

UNITED STATES PATENTS 3,102,080    8/1963    Raspe et al. _____ 195—51

FOREIGN PATENTS 249,258    1/1964    Australia.
970,965    9/1964    Great Britain.

OTHER REFERENCES

Chemical Abstracts, vol. 60, p. 8075, March 1964.

ALVIN E. TANENHOLTZ, Primary Examiner

U.S. Cl. X.R.

195—80, 81; 260—294.7; 424—267